(12) United States Patent
Borges et al.

(10) Patent No.: US 10,149,278 B2
(45) Date of Patent: Dec. 4, 2018

(54) ALERT NOTIFICATION MANAGEMENT FOR MULTIPLE USER DEVICES

(71) Applicant: Apple Inc., Cupertino, CA (US)

(72) Inventors: Daniel R. Borges, San Francisco, CA (US); Michael J. Giles, San Jose, CA (US); Craig P. Dooley, Cupertino, CA (US); Prateek Sharma, San Jose, CA (US); Sanjay K. Verma, San Jose, CA (US); Deepankar Bhattacharjee, Milpitas, CA (US)

(73) Assignee: Apple Inc., Cupertino, CA (US)

( * ) Notice: Subject to any disclaimer, the term of this patent is extended or adjusted under 35 U.S.C. 154(b) by 231 days.

(21) Appl. No.: 15/279,338

(22) Filed: Sep. 28, 2016

(65) Prior Publication Data

US 2017/0094638 A1    Mar. 30, 2017

Related U.S. Application Data

(60) Provisional application No. 62/235,410, filed on Sep. 30, 2015.

(51) Int. Cl.
*H04M 1/725* (2006.01)
*H04W 68/02* (2009.01)
(Continued)

(52) U.S. Cl.
CPC ......... *H04W 68/02* (2013.01); *H04L 12/1895* (2013.01); *H04L 51/20* (2013.01);
(Continued)

(58) Field of Classification Search
CPC ... H04L 67/10; H04L 29/06027; H04L 41/00; H04L 65/4007; H04L 41/50; H04W 16/14; H04W 84/12; H04W 28/16; H04W 4/08
See application file for complete search history.

(56) References Cited

U.S. PATENT DOCUMENTS

| 9,572,184 B1 | 2/2017 | Erdogan |
| 9,848,079 B2 | 12/2017 | Rauenbuehler et al. |

(Continued)

FOREIGN PATENT DOCUMENTS

| KR | 1020140049449 A | 4/2014 |
| KR | 1020140077093 A | 6/2014 |

(Continued)

OTHER PUBLICATIONS

European Patent Application No. 16191555.8—Extented European Search Report dated Mar. 15, 2017.
(Continued)

*Primary Examiner* — Ronald Eisner
(74) *Attorney, Agent, or Firm* — Dickinson Wright RLLP

(57) ABSTRACT

Techniques for coalescing alert notifications for applications and/or services to a primary user device of a set of multiple associated user devices within proximity of each other. When a user device is not in proximity to other associated user devices, the user device functions as a primary user device and provides alert notifications based on a default configuration and/or a user configurable setting. When the user device is within proximity of one or more other associated user devices, the user devices exchange relevant capability information and information for applications that are synchronized via network-based services. The user devices negotiate to determine a user device that serves as the primary user device to provide alert notifications for a set of applications and services common to a set of user devices. The other user devices are configured to reduce and/or suppress the alert notifications.

20 Claims, 8 Drawing Sheets

(51) Int. Cl.
*H04W 76/25* (2018.01)
*H04W 4/80* (2018.01)
*H04L 29/08* (2006.01)
*H04W 8/00* (2009.01)
*H04W 8/22* (2009.01)
*H04W 48/16* (2009.01)
*H04L 12/58* (2006.01)
*H04L 12/18* (2006.01)
*H04W 4/08* (2009.01)
*H04L 29/06* (2006.01)
*H04W 84/12* (2009.01)

(52) U.S. Cl.
CPC .......... *H04L 67/1072* (2013.01); *H04L 67/18* (2013.01); *H04L 67/322* (2013.01); *H04L 69/24* (2013.01); *H04W 4/08* (2013.01); *H04W 4/80* (2018.02); *H04W 8/005* (2013.01); *H04W 8/22* (2013.01); *H04W 48/16* (2013.01); *H04W 76/25* (2018.02); *H04W 84/12* (2013.01)

(56) References Cited

U.S. PATENT DOCUMENTS

| | | |
|---|---|---|
| 2002/0018546 A1 | 2/2002 | Horne |
| 2004/0204168 A1 | 10/2004 | Laurila |
| 2004/0223479 A1 | 11/2004 | Vallstrom et al. |
| 2006/0221943 A1 | 10/2006 | Aborn et al. |
| 2008/0107252 A1 | 5/2008 | Forte |
| 2008/0248797 A1 | 10/2008 | Freeman et al. |
| 2008/0311851 A1 | 12/2008 | Hansen et al. |
| 2010/0124947 A1 | 5/2010 | Sano |
| 2010/0266114 A1 | 10/2010 | Fan et al. |
| 2013/0339436 A1* | 12/2013 | Gray ............... H04L 51/24 709/204 |
| 2014/0315511 A1 | 10/2014 | Cha et al. |
| 2015/0195692 A1* | 7/2015 | Chow ............... H04M 19/04 455/414.1 |
| 2015/0245186 A1 | 8/2015 | Park et al. |
| 2015/0351074 A1 | 12/2015 | Vyas et al. |
| 2016/0286337 A1 | 9/2016 | Sivaraman et al. |
| 2016/0360031 A1 | 12/2016 | Rauenbuehler et al. |
| 2016/0360503 A1 | 12/2016 | Rauenbuehler et al. |
| 2017/0289155 A1 | 10/2017 | Kerai |
| 2018/0255174 A1 | 9/2018 | Rauenbuehler et al. |

FOREIGN PATENT DOCUMENTS

| | | |
|---|---|---|
| KR | 101482000 B1 | 1/2015 |
| WO | 2008033607 A2 | 3/2008 |
| WO | 2014000163 A1 | 1/2014 |
| WO | 2014092441 A1 | 6/2014 |

OTHER PUBLICATIONS

International Patent Application No. PCT/US2016/035194—International Search Report and Written Opinion dated Aug. 31, 2016.

Korean Patent Application No. 10-2016-0126364—Notice of Allowance dated Jan. 9, 2018.

* cited by examiner

ALERT NOTIFICATION MANAGEMENT FOR MULTIPLE USER DEVICES

CROSS-REFERENCE TO RELATED APPLICATIONS

This Application claims the benefit of U.S. Provisional Patent Application No. 62/235,410, entitled "ALERT NOTIFICATION MANAGEMENT FOR MULTIPLE USER DEVICES" and filed Sep. 30, 2015, the content of which is incorporated herein by reference in its entirety for all purposes.

This Application is related to the following U.S. Provisional Patent Applications, both of which are incorporated by reference herein in their entirety for all purposes: (1) U.S. Provisional Patent Application No. 62/172,025, entitled "CALL MANAGEMENT BETWEEN MULTIPLE USER DEVICES" and filed Jun. 5, 2015; and (2) U.S. Provisional Patent Application No. 62/172,028, entitled "MULTI-DEVICE CALL NOTIFICATION SILENCING" and filed Jun. 5, 2015.

FIELD

The described embodiments relate generally to communications using electronic devices, including systems and techniques for managing notifications and alerts for multiple associated user devices.

BACKGROUND

Recent technological advances had led to situations where an individual has multiple different active electronic devices available for communication, often at the same general location and at the same time. In addition to a smart phone, a user may also simultaneously have a tablet device, a laptop computer, a desktop computer, a portable media player, a wearable computing device, and/or one or more other electronic devices, some or all of which may be able to conduct wireless communications using one or more different radio access technologies (RATs). The multiple different electronic devices can be associated with a common account, and the user can receive notifications and/or alerts for various services, including incoming requests to establish communication sessions, on multiple electronic devices concurrently. The notifications/alerts can be indicated to a user by one or more different outputs from the various electronic devices, such as an audible indication (e.g., a ringtone or alert sound), a visual indication (e.g., a pop-up window, a drop down window, or an application badge or icon change), and/or a haptic indication (e.g., a vibration or tapping pattern). Concurrent notification on multiple electronic devices and particularly simultaneous audible indications therefrom can be annoying to the user. While the user can configure the various electronic devices individually for preferred responses, the process can be cumbersome and unwieldy with multiple devices involved. Moreover, both the user and many electronic devices are mobile, and as such which electronic device (or devices) may be preferred for providing particular types of notifications, e.g., which of multiple electronic devices within proximity of the user to output an auditory notification/alert, can change over time.

In view of the foregoing, there is a need for user electronic devices that are capable of intelligently and efficiently managing notifications and alerts between themselves to provide the best user experience possible.

SUMMARY

Representative embodiments set forth herein disclose various systems and techniques for intelligently and efficiently managing alert notifications between multiple associated user devices. In particular, the embodiments set forth various systems and techniques for coalescing alert notifications for applications and/or services to a primary user device of a set of multiple associated user devices that are within proximity of each other. Each user device can be associated with a common network-based service account, e.g., an iCloud® account, and can be configured to receive notifications for various applications and services. When a user device is not in proximity to other associated user devices, the user device can function as a primary user device and provide alert notifications to a user based on a default configuration and/or a user configurable setting, which can vary for different applications and services in some embodiments. When the user device is within proximity of one or more other associated user devices, the user devices can exchange relevant capability information among each other, such as device type, software versions, hardware versions, configuration settings, operating states, battery level, user interaction states, and/or power source. The user devices can also exchange information for applications that are synchronized via network-based services, such as via iCloud, including calendars, reminders, mail, in addition to communication services that can provide, voice connections, video connections, and/or messaging connections. The user devices can negotiate to determine a user device that can serve as the primary user device to provide alert notifications for a set of applications and services common to a set of user devices. The other user devices, which can be referred to as secondary user devices, in the set of user devices can be configured to reduce and/or suppress the alert notifications presented. In some embodiments, the secondary user devices can mute audible alert notifications and/or provide silent alert notifications, while a primary user device can provide audible alert notifications for applications and/or services that are synchronized between the set of user devices.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described will become apparent from the following Detailed Description, Figures, and Claims.

Other aspects and advantages of the embodiments described herein will become apparent from the following detailed description taken in conjunction with the accompanying drawings which illustrate, by way of example, the principles of the described embodiments.

BRIEF DESCRIPTION OF THE DRAWINGS

The included drawings are for illustrative purposes and serve only to provide examples of possible structures and arrangements for the disclosed systems and techniques for intelligently and efficiently managing calls and other communications between multiple associated user devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

DETAILED DESCRIPTION

Figure 1:
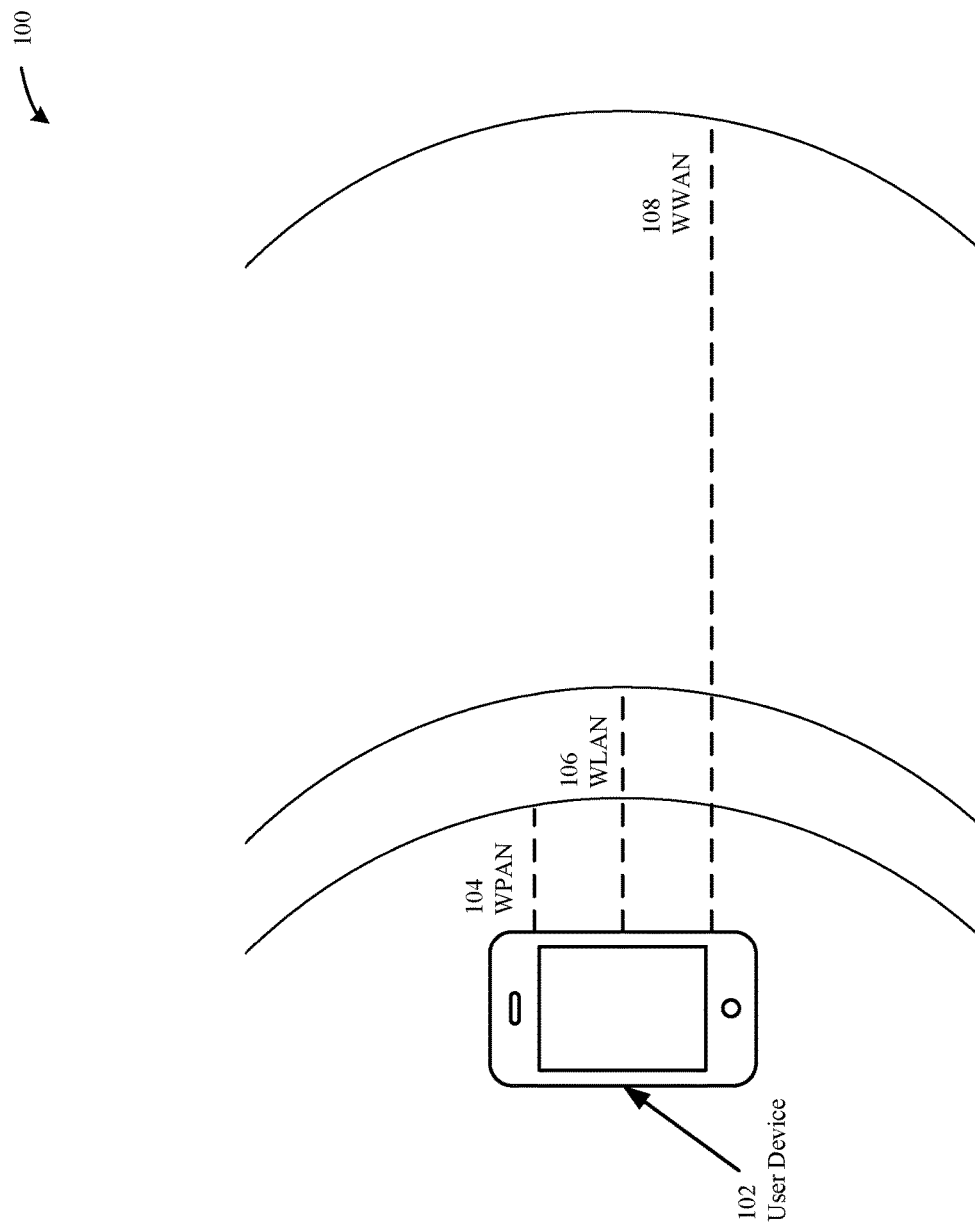
FIG. 1 illustrates in block diagram format a set of overlapping networks for an exemplary user device according to various embodiments of the present disclosure.

Representative applications of apparatuses, systems, and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

Representative embodiments set forth herein disclose various systems and techniques for intelligently and efficiently managing alerts and notifications between multiple associated user devices. In particular, the embodiments set forth various systems and techniques for coalescing alerts and notifications for applications and/or services to a primary user device of a set of multiple associated user devices that are within proximity of each other. The terms "alert" and "notification" are used synonymously herein to refer to any indication presented on a user interface (UI) of a user device, particularly for important events. Alerts/notifications can appear at the top or corner of a screen (also referred to as a banner) for a short period of time or can overlay in the center of the screen until acknowledged or until a timeout occurs. Some alerts/notifications associated with applications provide an indication as a badge overlaid on the application icon. The consolidated term "alert notification" will be used to refer to any such notification indication whether a banner, a pop-up window, or an actionable interrupt. Many applications and services can provide for alert notifications to present supplemental information at a user device, such as to indicate initiation of a proposed service connection (voice, video, Internet messaging, teleconferencing, etc.), to catalog one or more events (email, voice mail, reminders, appointments, etc.), or to indicate near real time information (stock, weather, sports, news, etc.). Alert notifications can be organized into various categories and presented to the user of the mobile wireless communication device on demand (e.g., in response to a user input), as an overlay (e.g., as an indicator associated with a graphical icon), or as an interrupt (e.g., as a pop-up message requiring a user response). User devices can be configured to present alert notifications in different forms, e.g., based on user preference or based on applicability to a service/application. The alert notifications can be provided by one or more different outputs from the various user devices, such as an audible indication (e.g., a ringtone or alert sound), a visual indication (e.g., a pop-up window, a drop down window, or an application badge or icon change), and/or a haptic indication (e.g., a vibration or tapping pattern). Concurrent alert notifications on multiple devices, and particularly simultaneous audible indications therefrom, can be annoying. While the user can configure the various user devices individually for preferred responses, the process can be cumbersome and unwieldy with multiple user devices involved. Moreover, both the user and many user devices are mobile, and as such, which user device (or set of multiple user devices) may be preferred for providing particular types of alert notifications, e.g., which of multiple user devices within proximity of the user to output an auditory alert notification, can change over time.

Each user device can be associated with a common network-based service account, e.g., an iCloud account, and can be configured to receive alert notifications for various applications and services. When a user device is not in proximity to other associated user devices, the user device can function as a primary user device and provide alert notifications to a user based on a default configuration and/or based on a user configurable setting, which can vary for different applications and services in some embodiments. When the user device is within proximity of one or more other associated user devices, the user devices can exchange relevant capability information among each other, such as device type, software versions, hardware versions, configuration settings, operating states, battery level, user interaction states, and/or power source. The user devices can also exchange information for applications that are synchronized via network-based services, such as via iCloud or via application specific servers. Representative applications include a scheduling calendar, an email application, a "reminder" or "to do" list, social networking applications, in addition to communication services that can provide voice connections, video connections, and/or messaging connections. The user devices can negotiate to determine a user device that can serve as the primary user device to provide alert notifications for a set of applications and services common to a set of user devices. The other user devices, which can be referred to as secondary user devices, in the set of user devices can be configured to reduce or minimize the alert notifications presented.

In some embodiments, the secondary user devices can mute audible alert notifications and/or provide silent alert notifications, while a primary user device can provide audible alert notifications (if applicable) for applications and/or services that are synchronized between the set of user devices. When an additional associated user device enters within proximity of the primary user device, a re-negotiation among the set of user devices can occur. When a secondary user device and/or the primary user device moves so that the secondary user device is not in proximity to the primary user device, the secondary user device can revert to a default configuration and/or a user configurable setting for alert notifications. Each user device in the set of user devices can maintain a "keep alive" protocol to confirm relative proximity between the primary user device and the secondary user devices. In some embodiments, the set of user devices detect proximity to each other and communicate with each other based on a wireless personal area network (WPAN) wireless communication protocol, e.g., a Bluetooth® (BT) Classic or Bluetooth Low Energy (BTLE) wireless communication protocol, and/or based on a wireless local area network (WLAN) wireless communication protocol, e.g., a peer-to-peer Wi-Fi wireless communication protocol or an Apple Wireless Direct Link (AWDL) wireless communication protocol. When the primary user device moves out of proximity of the set of secondary user devices and/or powers off (or enters another state in which the primary user device is not detectable and/or communicable with the secondary user devices), the remaining set of secondary user devices can re-negotiate to determine a new primary user device.

In some embodiments, the negotiation of a primary user device can be based on proximity to a user and/or based on user activity. A wearable computing device that is operable on the user can serve as a proxy for the user to determine proximity to the user. Another user device can be within proximity to the user when the wearable computing device can detect signals directly from and/or communicate directly with the another user device. In some embodiments, a relative distance of a user device can be determined based on signal strength for signals received directly from the user device and/or based on information about signal transmit levels and/or signal transmit capabilities for the user device. In some embodiments, audible alert notifications can be presented to the user by a closest user device, which can be designated as the primary user device based on proximity to the user (and based on capability to provide audible alert notifications). In some embodiments, a historical use of one or more of the set user devices can be used to determine a most recently used user device from among the set of user devices in proximity to each other, and a user device being actively used (or one of multiple user devices in active use) or the most recently used user device can be designated the primary user device. In some embodiments, a most recently used user device or an actively used user device can be considered a proxy for the user and proximity from the most recently used user device (e.g., when no user devices are in active use by the user) or from the actively used user device can be used to determine proximity to the user. In some embodiments, a user device is excluded from being selected as a primary user device from among a set of user devices when the user device is configured to not provide auditory alerts (e.g., muted and/or set to a "do not disturb" configuration setting).

In some embodiments, select alert notifications can be prioritized to alert on all possible user devices, e.g., based on an alert type and/or based on a user preference or configuration setting. In some embodiments, the selection of a primary user device can be based on capabilities for a service and/or application that be provided via the primary user device, e.g., certain user devices may be appropriate for particular services and/or applications, while other user devices may be inappropriate or incapable of providing alert notifications applicable for particular services and/or applications. In some embodiments, applications and/or services can be customized for alert notifications based on user location, time of day, day of week, and/or a user configurable mode, e.g., "at work" or "on vacation", and such customizations can be accounted for as part of capabilities exchange and negotiation for a primary user device from among a set of user devices in proximity.

Accordingly, the foregoing approaches provide systems and techniques for intelligently and efficiently managing alert notifications among multiple associated user devices. A more detailed discussion of these systems and techniques is set forth below and described in conjunction with FIGS. 1 through 7, which illustrate detailed diagrams of systems and methods that can be used to implement these systems and techniques.

Wireless devices, and mobile devices in particular, can incorporate multiple different radio access technologies (RATs) to provide connections through different wireless networks that offer different services and/or capabilities. A wireless device can include hardware and software to support a wireless personal area network ("WPAN") according to a WPAN communication protocol, such as those standardized by the Bluetooth® special interest group ("SIG") and/or those developed by Apple referred to as an Apple Wireless Direct Link (AWDL). The wireless device can discover compatible peripheral wireless devices and can establish connections to these peripheral wireless devices located in order to provide specific communication services through a WPAN. In some situations, the wireless device can act as a communications hub that provides access to a wireless local area network ("WLAN") and/or to a wireless wide area network ("WWAN") to a wide variety of services that can be supported by various applications executing on the wireless device. Thus, communication capability for a secondary wireless device, e.g., without and/or not configured for WWAN communication, can be extended using a local WPAN (or WLAN) connection to a primary wireless device that provides a WWAN connection. Alternatively, the secondary wireless device can also include wireless circuitry for a WLAN connection and can originate and/or terminate connections via a WLAN connection. Whether to use a direct connection or a relayed connection can depend on performance characteristics of one or more links of an active communication session between the secondary wireless device and a remote device. Fewer links (or hops) can provide for lower latency, and thus a direct connection can be preferred; however, unlike a legacy circuit-switched connection that provides a dedicated link, the direct connection via a WLAN can share bandwidth with other wireless devices on the same WLAN and/or with the backhaul connection from the access point that manages the WLAN. When performance on the local WLAN connection link and/or on the backhaul connection degrades, a relayed connection via a primary wireless device can be preferred. By monitoring performance of an active communication session and availability and capabilities of associated wireless devices (such as proximity to a primary wireless device), a secondary wireless device can request transfer of an active communication session between a direction connection and a relayed connection or vice versa.

In accordance with various embodiments described herein, the terms "wireless communication device," "wireless device," "mobile device," "mobile station," "wireless station", "wireless access point", "station", "access point", "user equipment" (UE), "wireless user device", and "user device" may be used interchangeably herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) LTE, LTE Advanced (LTE-A), and/or 5G or other present or future developed advanced cellular wireless networks.

The wireless device, in some embodiments, can also operate as part of a wireless communication system, which can include a set of client devices, which can also be referred to as stations, client wireless devices, or client wireless devices, interconnected to an access point (AP), e.g., as part of a WLAN, and/or to each other, e.g., as part of a WPAN and/or an "ad hoc" wireless network, such as a Wi-Fi direct connection. In some embodiments, the client device can be any wireless device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies.

Additionally, it should be understood that wireless devices described herein may be configured as multi-mode wireless communication devices that are also capable of communicating via different third generation (3G) and/or second generation (2G) RATs. In these scenarios, a multi-mode wireless device can be configured to prefer attachment to LTE networks offering faster data rate throughput, as compared to other 3G legacy networks offering lower data rate throughputs. For instance, in some implementations, a multi-mode wireless device may be configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

FIG. 1 illustrates a diagram 100 of a set of overlapping wireless networks for a user device 102 illustrated in block diagram format. The user device 102 can include a combination of hardware and software to provide wireless connections using one or more different wireless networks alone, separately, or in combination, such as via the set of overlapping networks. The user device 102 can represent a device having wireless communications capabilities, such as a smart phone (e.g., an iPhone®), a tablet device (e.g., an iPad®), a wearable computing device (e.g., an Apple Watch™), a portable media player (e.g., an iPod®), a laptop computer (e.g., a MacBook®), a desktop computer (e.g., an iMac®), a digital media server/extender (e.g., an Apple TV®), among other possible devices. Additional user devices, which can connect to the user device 102 and provide audio, video, and/or data media interfaces supplemental to the user device 102 can include a wireless headset, a vehicle sound system, a digital television, a digital media recorder, a wearable computing device or any other suitable wireless device capable of wireless communication and input/output capabilities.

The user device 102 can include a combination of hardware, software, and/or firmware to provide communication using a WPAN 104, which can provide power efficient connections while operating over a limited distance. WPAN 104 connections can typically provide for connecting the user device 102 to peripheral and associated wireless devices, such as headsets, earpieces, supplemental display devices, and supplemental input/output devices, for example. WPAN 104 connections can also be used to relay communication between the user device 102 and the peripheral wireless devices through which the user can interact for a communication session. A user device can use WPAN 104 communication to exchange capabilities information and/or to detect proximity of other nearby user devices. A representative WPAN 104 can operate in accordance with a communication protocol specified by the Bluetooth SIG, for example Bluetooth Classic and/or Bluetooth Low Energy (BTLE), and/or by Apple Inc. such as an Apple Wireless Direct Link (AWDL). The user device 102 can also include a combination of hardware, software, and/or firmware to provide communication using a WLAN 106 that can provide a higher data rate and a greater operating range than a WPAN 104. The user device 102 can include separate and/or shared hardware, software, and/or firmware elements for the WPAN 104 and the WLAN 106. Both the WPAN 104 and WLAN 106 can operate as "local" wireless networks. A representative WLAN 106 can operate in accordance with a communication protocol specified by the Institute of Electrical and Electronic Engineers (IEEE), such as the IEEE 802.11 family of wireless standards, which in some versions can also be referred to as Wi-Fi. The user device 102 can also include additional hardware, software, and/or firmware to provide a WWAN 108 capability, such as to interconnect with one or more cellular wireless networks. The user device 102 can provide a multitude of services using one or more connections through its wireless networking capabilities. In some embodiments, the user device 102 can use WPAN 104 capability and/or WLAN 106 capability to detect proximity of other user devices 102 and to negotiate among a set of associated user device 102 that share a common service account, e.g., registered to the same iCloud account, to determine alert notification capabilities for each user device 102. In some embodiments, a user device 102 can serve as a primary user device 102 to provide alert notifications for applications and/or services for the set of user devices 102 within proximity of each other (or for a subset of the user device 102 within proximity of each other) that share common applications and/or services. In some embodiments, the primary user device 102 provides auditory alert notifications (and/or another form of interrupt based alert notification), while the secondary user devices 102 provide silent alert notifications (and/or another form of non-interrupt based alert notification).

Figure 2:
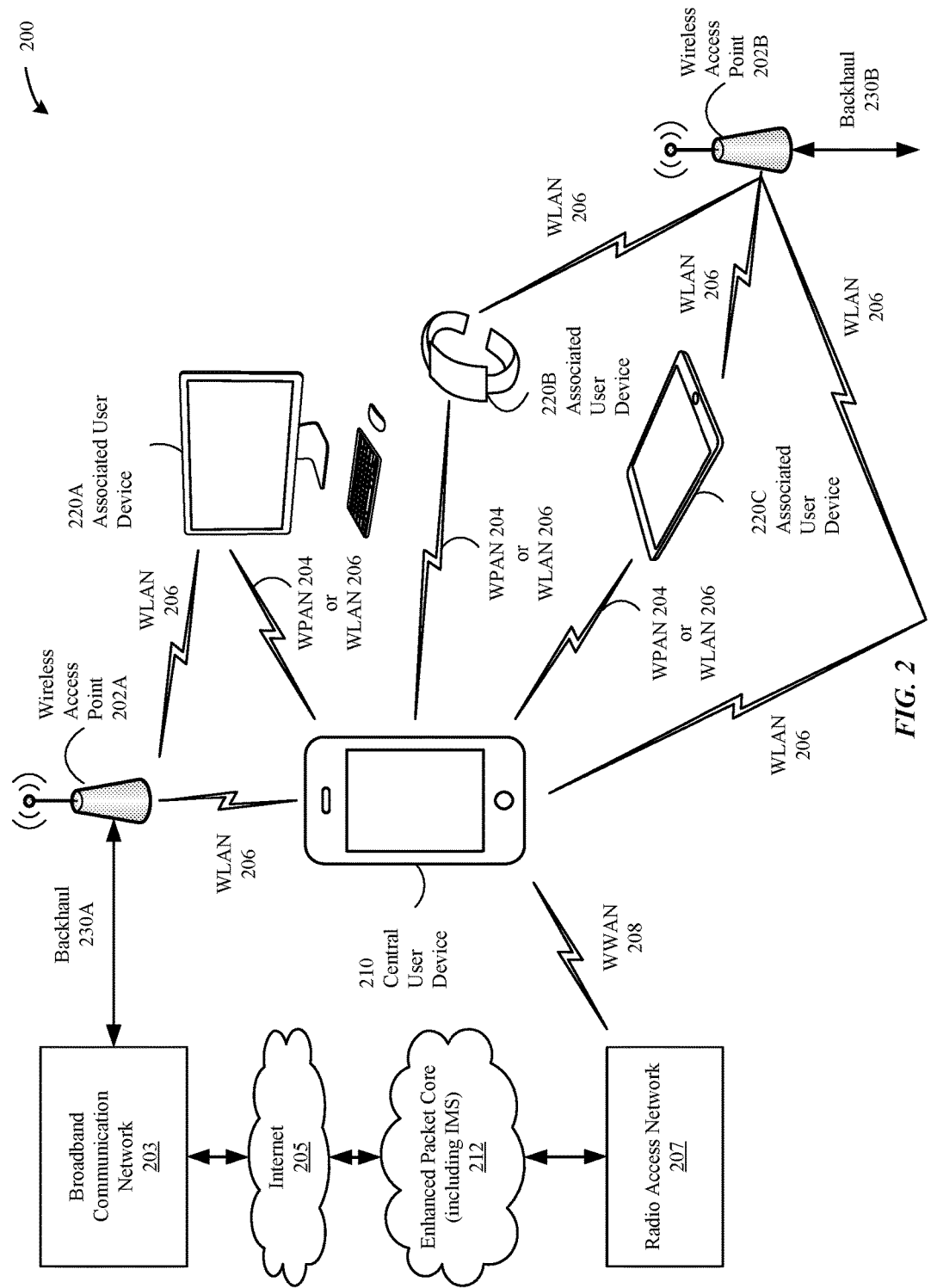
FIG. 2 illustrates in block diagram format an exemplary system of different wireless networks and user devices according to various embodiments of the present disclosure.

FIG. 2 illustrates, in block diagram format, an exemplary system 200 including different wireless network connections and different user devices according to various embodiments of the present disclosure. System 200 includes a central wireless device 210 that can be interconnected through several different wireless communication technologies to an external set of networks and to a set of one or more associated user devices 220A, 220B, and 220C. The central wireless device 210 can be a "central" device for WPAN purposes and/or can form direct WLAN connections, such as Wi-Fi direct or AWDL links, to one or more of the associated user devices 220A/B/C. The central user device 210 can receive information from one or more packet-switched wireless networks and/or from one or more circuit-switched wireless networks. For example, the central user device 210 can connect via a WWAN connection 208 through a radio access network 207 and via an enhanced packet core network 212, which can include an Internet Protocol (IP) Multimedia Subsystem (IMS) to manage packet connections such as for Voice over LTE (VoLTE). The central user device 210 can use the WWAN connection 208 to access a broad variety of services (e.g., voice calls, text messages, data access, video calls, multimedia messaging, and media streaming). Similarly, the central user device 210 can use a WLAN connection 206 provided through a wireless access point 202A interconnected to a broadband communication network 203 via a backhaul connection 230A to access a similar wide range of services (or through wireless access point 202B interconnected via a backhaul connection 230B to the same (or another) broadband communication network 203. The broad set of services provided through the WWAN connection 208 and/or through the WLAN connection 206 can be extended to one or more of the secondary user devices 220 A/B/C through additional WLAN 206 or WPAN 204 connections, such that a WWAN connection 208 to the central user device 210 can be relayed, e.g., audio, video, text, and/or other media packets can be communicated between the central user device 210 and one or more associated user devices 220A/B/C that can provide input/output capabilities for a user. Additionally, and/or alternatively, the associated user devices 220A/B/C (or a subset of them) can form direct connections via a WLAN 206 connection and/or via a WWAN 208 connection (not shown) for a variety of services. In some embodiments, one or more network-based servers maintain status information for the central user device 210 and/or the associated user devices 220 A/B/C and provide alert notifications to the central user device 210 and/or the associated user devices 220 A/B/C individually and/or in parallel.

Each of the associated user devices 220A, 220B, 220C illustrated in FIG. 2 can provide output display capabilities as well as input response capabilities to allow a user of the primary wireless device 210 to interact with various services or otherwise relay connections or communications, such as through one or both of a WLAN 206 connection or a WPAN 204 connection. For example, any of associated user devices 220A, 220B, 220C can provide call relay functionality for an incoming audio/video/interactive messaging connection or other applicable connection in conjunction with the central user device 210, such that the user can accept an incoming connection and/or originate an outgoing connection at any of the associated user devices 220A, 220B, or 220C. Such call relay functionality can be facilitated by way of WLAN connections to a host server (e.g., using an iCloud® service) via a common wireless access point 202A and/or 202B, or by the various WPAN 204 connections or direct WLAN 206 connections, for example. In addition, one, some or all of the associated user devices 220A, 220B, 220C can be stand-alone independent user devices 102 that are able to operate independently of the central user device 210. In one specific non-limiting embodiment, the associated user device 220A can be a desktop computing device, the associated user device 220B can be a wearable computing device, such as an electronic watch, and the associated user device 220C can be a tablet device. It will be readily appreciated that other types and arrangements of user devices can be used, and that fewer or more than three such devices can be associated user devices.

Figure 3A:
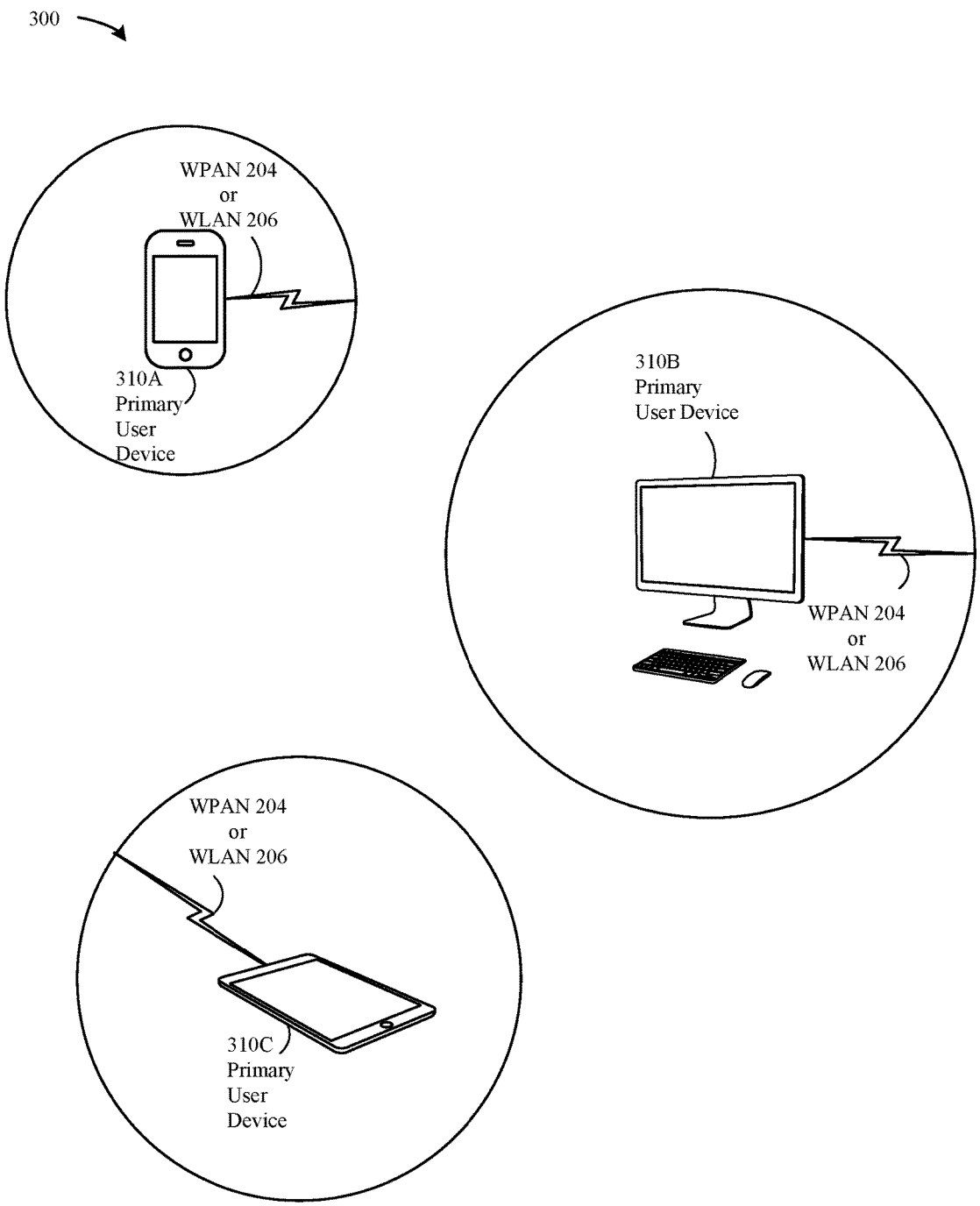
FIG. 3A illustrates in block diagram format a set of user devices with non-overlapping wireless network coverage according to various embodiments of the present disclosure.

FIG. 3A illustrates a block diagram 300 of a set of user devices 102 with non-overlapping wireless network coverage. Each user device 102 can act as a primary user device 310 A/B/C when there is no overlapping WPAN 204 network coverage and/or no overlapping WLAN 206 network coverage. The set of primary user devices 310 A/B/C can be associated with a common user account and can provide alert notifications for applicable services in response to control messages received by each of the primary user devices 310 A/B/C independently. Each of the primary user devices 310 A/B/C can use a WPAN 204 wireless communication protocol and/or a WLAN 206 wireless communication protocol to determine whether one or more other associated user devices 102 are within wireless network coverage proximity to the primary user device 310 A/B/C. When no other associated user devices 102 are within wireless network coverage proximity to the primary user device 310 A/B/C, each user device 102 acts as its own primary user device 310 A/B/C and provides alert notifications based on a default configuration and/or a user defined setting for alert notifications.

Figure 3B:
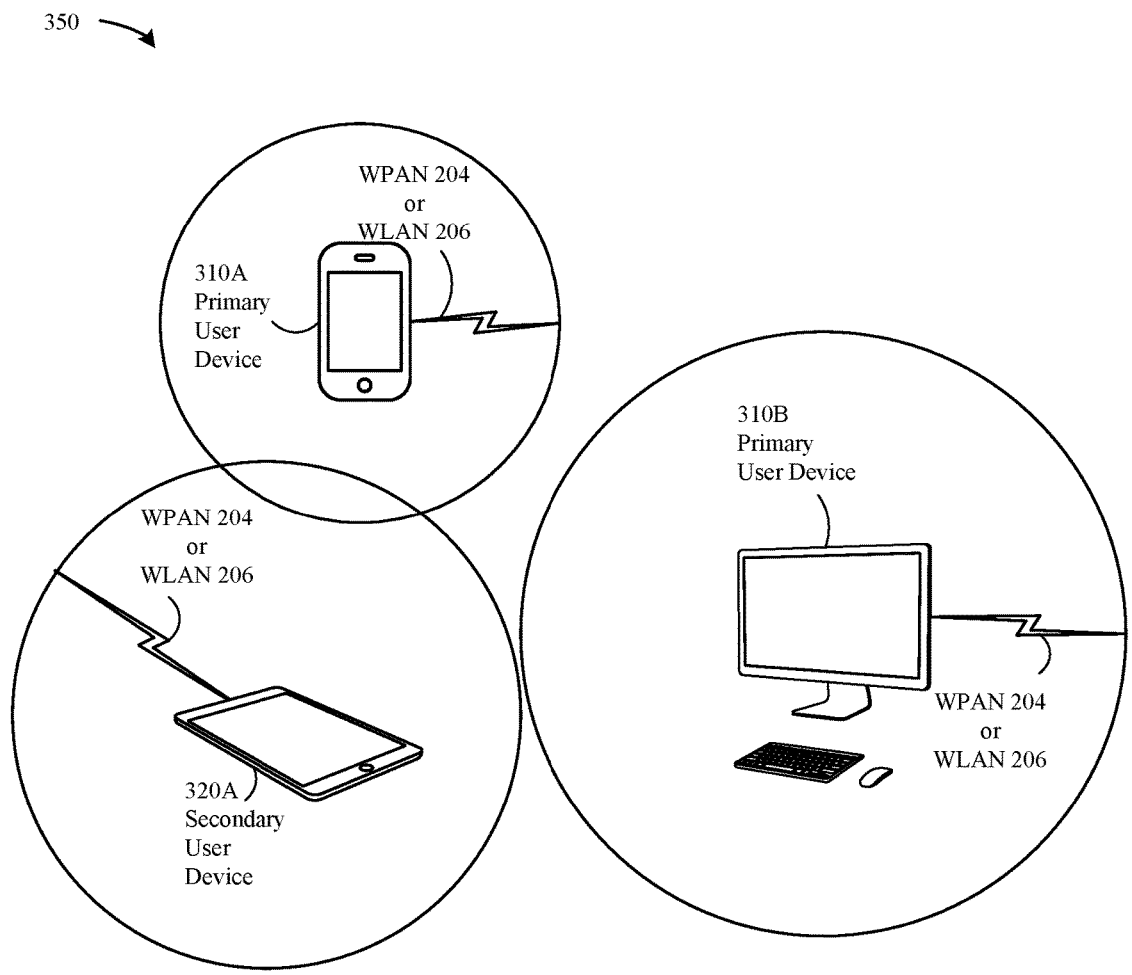
FIG. 3B illustrates in block diagram format a set of user devices with partially overlapping wireless network coverage according to various embodiments of the present disclosure.

FIG. 3B illustrates a block diagram 350 of a set of user devices 102 with partially overlapping wireless network coverage. When two user devices 102 come within overlapping wireless network coverage, the user devices 102 can exchange relevant capability information with each other, such as device type, software versions, hardware versions, configuration settings, operating states, battery level, user interaction states, and/or power source. The user devices 102 can also exchange information for applications that are synchronized via network-based services, such as via iCloud or via application specific servers. Representative applications include a scheduling calendar, an email application, a "reminder" or "to do" list, social networking applications, such as Facebook and Twitter, in addition to communication services that can provide voice connections, video connections, and/or messaging connections. When the user devices 102 are within proximity of each other, e.g., based on partially overlapping wireless network coverage, and the user devices 102 are associated with a common user account, the user devices 102 can negotiate with each other to designate one or more user devices 102 as primary user devices and other user devices 102 as secondary user devices. For example, as shown in FIG. 3B, a first user device 102 can be designated as a primary user device 310A, while a second user device 102 can be designated as a secondary user device 310B, for the set of associated user devices 310A and 320A. An additional user device 102 that does not have overlapping network coverage with the associated user devices 310 A and 320A can remain as its own primary user device 310B. Within the set of associated user devices 310A and 320A, while having overlapping wireless network coverage, the primary user device 310A can provide alert notifications, such as auditory alert notifications (and/or other interrupt alert notifications), while the secondary user device 320A can provide silent notifications (and/or other non-interrupt alert notifications). Separately the primary user device 310B can also provide alert notifications, such as auditory alert notifications in parallel with alert notifications provided by the primary user device 310A. A user device 102 can remain as a primary user device for a set of associated user devices 102, e.g., for the primary user device 310A and the secondary user device 320A, while both user devices 102 remain within overlapping wireless network coverage and/or until another user device 102 enters within overlapping wireless network coverage of the primary user device 310A and/or of the secondary user device 320A. For example, a third user device 102 (not shown) can enter within overlapping wireless network coverage of the primary user device 310A, and the primary user device 310A can negotiate with the third user device 102 as to whether the primary user device 310A will serve as an alert notification provider for the third user device 102, which will become a secondary user device while overlapping with the primary user device 310A, or whether the third user device 102 will remain as its own primary user device and provide alert notifications on its own. In another example, a fourth user device (not shown) can enter within overlapping network coverage of the secondary user device 320A, and the fourth user device can negotiate with the secondary user device 320A as to whether the fourth user device remains as its own primary user device or becomes a member of the set of associated user devices that includes the primary user device 310A and the secondary user device 320A, with the fourth user device 102 becoming an additional secondary user device.

Figure 4:
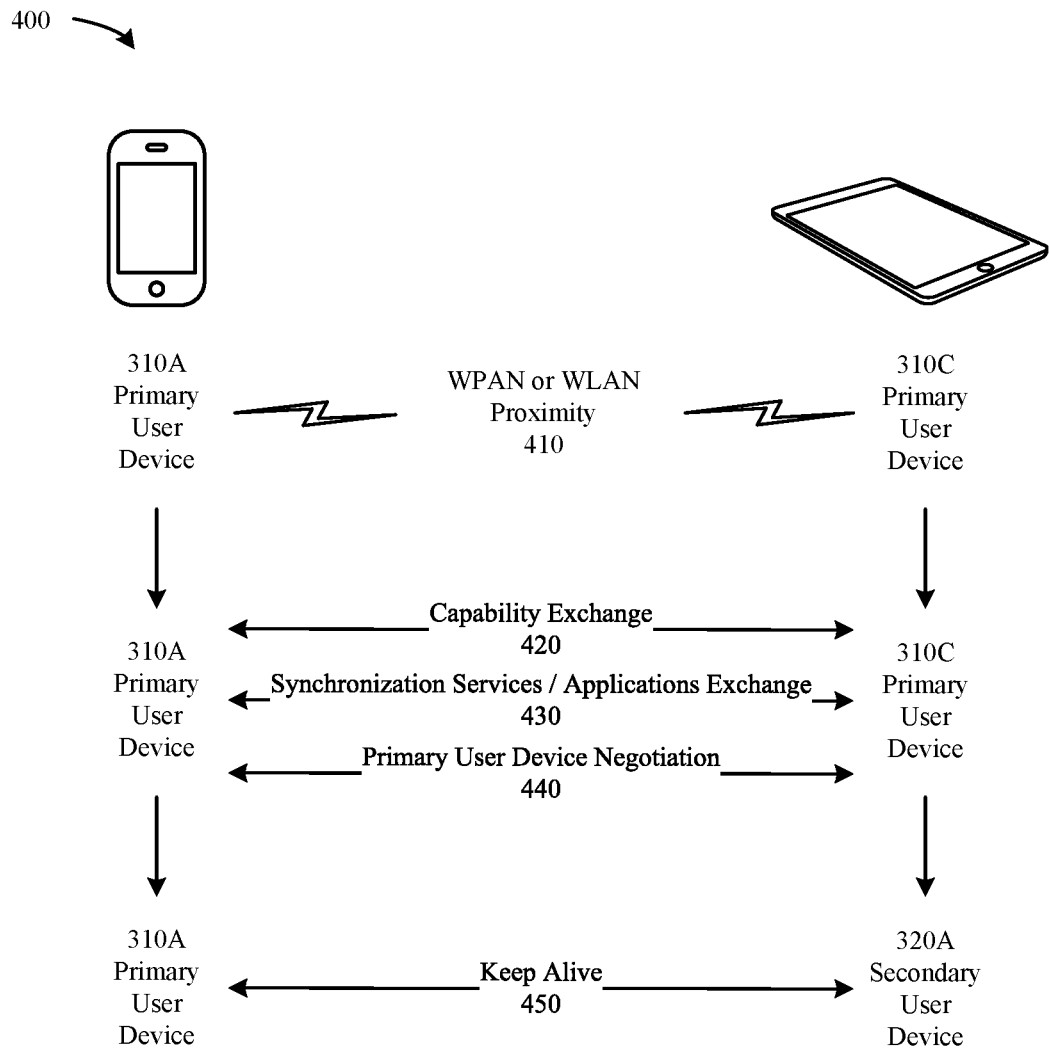
FIG. 4 illustrates a sequence diagram for an exemplary alert notification negotiation between associated user devices according to various embodiments of the present disclosure.

FIG. 4 illustrates a sequence diagram 400 for an exemplary alert notification process between associated user devices 102, namely between primary user device 310A and primary user device 310C. Initially both the primary user device 310A and the primary user device 310C can be configured to provide alert notifications independently. Each of the primary user device 310A and the primary user device 310C can also detect proximity 410 of another user device 102, such as each other, based on a WPAN 104 wireless communication protocol and/or a WLAN 106 wireless communication protocol. In an exemplary embodiment, the primary user device 310A and the primary user device 310C use a BLTE wireless communication protocol feature, such as a proximity profile, to determine the other user device 102 is within wireless network coverage proximity. In some embodiments, user devices 102 transmit and/or broadcast Bluetooth advertisement messages and/or Wi-Fi notification messages to other user devices, which can determine proximity based at least in part on the Bluetooth advertisement and/or Wi-Fi notification messages. In some embodiments, user device 102 listen for Bluetooth advertisement messages and/or Wi-Fi notification messages to determine proximity (e.g., based on overlapping wireless network coverage) of other user devices 102. In some embodiments, the Bluetooth advertisement messages and/or Wi-Fi notification messages include information about a state of a user device 102, e.g., whether the user device 102 is actively in use and/or whether the user device 102 is configured for providing particular types of alert notifications, such as in a mute or do not disturb state. In some embodiments, the Bluetooth advertisement messages and/or Wi-Fi notification messages include information about recent use, e.g., time since last use, which can be based on inactivity timers for one or more applications and/or services. In some embodiments, proximity between user devices 102 can also (or separately) include a determination of proximity to a user. For example, a wearable device that is configured to detect contact and/or use by a user, can serve as a proxy for the user, and proximity to the user can be determined based on wireless network coverage proximity to the wearable device.

In response to detecting proximity of another user device 102, the user devices 102 can perform a capability exchange 420 to share relevant user device 102 capability information. In some embodiments, the user devices 102 exchange information about network-based server accounts, such as iCloud accounts, to determine whether the user devices 102 are part of a common iCloud account. In some embodiments, a user device 102 provides information about one or more states of the user device 102, such as whether actively in use, a battery level (e.g., a value or above/below a threshold value), a display screen state (e.g., active on, reduced power on, or off), a ringer state (e.g., ringer on or mute/silent), a general alert notification state for the user device 102 (e.g., do not disturb), a specific alert notification state for one or more applications and/or services for the user device 102 (e.g., send direct to voice mail, do not display), a set of installed applications for the user device 102, a set of available communication services for the user device 102, input/output capabilities of the user device 102, a type of user device 102 (e.g., a desktop computer, a laptop computer, a tablet computer, a smart phone, a wearable device), a power source indication (e.g., battery power or coupled to AC power), a user interaction state for the user device 102 and/or for specific applications/services for the user device 102, a system preferences configuration for the user device 102, a ringer volume level, etc. In some embodiments, a user device 102 provides information about particular applications and/or services, and/or capabilities and/or configurations thereof to other user devices 102 within proximity. In some embodiments, different classes of applications and/or services can be tied to different actions to take for an alert notification. In some embodiments, proximity is determined based on a tunable pairing distance that can account for audible range for auditory alert notifications from the user devices 102. For example, a user device 102 can be determined to be proximate to another user device 102 when overlapping wireless network coverage for a WPAN 104 and/or a WLAN 106 exists and the user devices 102 are within audible range of each other (e.g., based at least in part on ringer volume settings or other auditory alert volume settings for the respective user device 102), which can be determined as part of and/or following the capability exchange 420. In some embodiments, a user device 102 can become a primary user device for a set of user devices 102 for a particular application and/or service only when the user device 102 is configured for use with the particular application and/or service. Thus, within a set of user devices 102 with overlapping wireless network coverage, two or more different user devices 102 can be designated as primary user devices for different applications/services.

Following the capability exchange 420 and the services/applications exchange 430, the primary user device 310A and the primary user device 310C can negotiate to determine whether they each remain as independent primary user devices or whether one user device 102 becomes a secondary user device, as indicated by the primary use device negotiation 440 in FIG. 4. Negotiation can include user configuration and/or system configuration for the user devices 102, such as based on the device capability information provided in the capability exchange 420 and/or service/application information provided in the services/applications exchange 430. When device negotiation is complete, either both user devices 102 remain as primary user devices, or one user device 102 becomes the primary user device for both user devices 102, such as primary user device 310A, while the other user device 102 becomes a secondary user device, such as secondary user device 320A. The primary user device 102 takes responsibility for alert notifications for the secondary user device 320 for one or more applications and/or services that are synchronized between the two user devices 102. The secondary user device 320A can mute (silence) any alert notifications while within proximity of the primary user device 310A. The primary user device 310A and the secondary user device 320A can provide messages as part of a keep alive protocol 450 to confirm their relative proximity to each other. When another user device 102 comes within proximity of the primary user device 310A and/or the secondary user device 320A, e.g., based on a WPAN or WLAN proximity 410, the third user device 102 can perform a similar capability exchange 420, services/applications exchange 430, and primary user device negotiation 440, with the proximate user device 102. In some embodiments, when the primary user device 310A moves to be not proximate to the secondary user device 320A, which can occur when WPAN or WLAN proximity 410 is no longer true, and/or when the primary user device 310A powers off, the secondary user device 320A can revert to a default configuration, e.g., as the primary user device 310C again, and/or can negotiate with one or more other user devices 102 with which the secondary user device 320A has overlapping wireless network coverage (and/or within proximity of the secondary user device 320A). In some embodiments, when a battery level of the primary user device 310A falls below a threshold battery level and/or when a configuration of the primary user device 310A changes, such as when the user configures the primary user device 310A into a mute/silent mode of operation (for the primary user device 310 as a whole and/or for one or more applications/services for which the primary user device 310 provides alert notification), then a re-negotiation among a set of user devices 102 within proximity (e.g., within WPAN or WLAN proximity 410) can occur to determine a subsequent state for each of the user devices 102 in the set of user devices 102. For example, a new primary user device can be selected from the remaining set of previously secondary user devices. Additional trigger events that can cause re-negotiation can include a power state transition by one or more of the associated user devices, a configuration change of one of the user devices, an application change (such as a setting and/or addition of the application and/or deletion of the application), a service change, a user setting, and/or a power source. In some embodiments, each of the associated user devices, in a set of user devices that includes one or more primary user devices and one or more secondary user devices, maintains state machine information for itself and for other user devices in the set of associated user devices. In some embodiments, each user device receives notification of state changes from other user devices in the set of user devices in response to a state change. In some embodiments, user devices maintain information about a user and/or proximity of each user device to the user. In some embodiments, operational states of the user devices are exchanged among the set of associated user devices, and each user device can determine an appropriate method for providing an alert notification based on its own state and/or states of the other associated user devices. In some embodiments, preference for selecting a user device as a primary user device for a set of associated user devices can be based on any combination of: (1) proximity to a user, (2) ringer volume, (3) audible distance, (4) estimated physical distance, (5) wireless signal strength, or (6) historical use. In some embodiments, a most recently used device is selected, when capable of providing alert notifications for one or more applications or services shared by the set of associated user devices. In some embodiments, a closest proximate device to a user is preferred as a primary user device to provide alert notifications for one or more applications and/or services shared by the primary user device and other user devices in the set of associated user devices.

Figure 5:
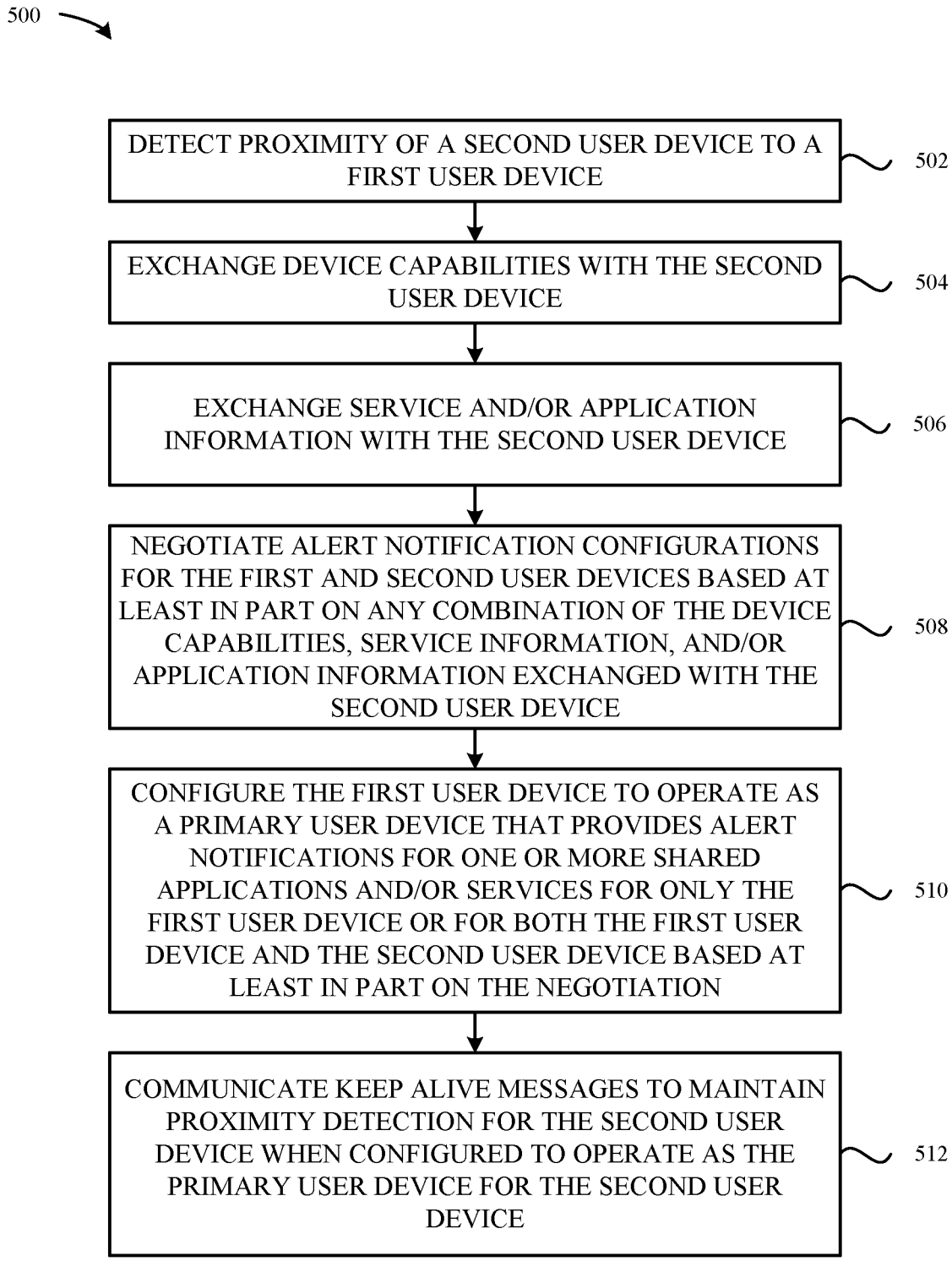
FIG. 5 illustrates a flowchart of an exemplary method performed by an alert notification manager for managing alert notifications by a user device of a set of associated user devices according to various embodiments of the present disclosure.

FIG. 5 illustrates a flowchart 500 of an exemplary method to manage alert notifications by a user device 102 of a set of associated user devices 102. In some embodiments, the exemplary method is performed by an alert notification manager, in any combination of software, firmware, and/or hardware of a first user device 102. In step 502, the first user device 102 detects proximity of a second user device 102. In some embodiments, proximity is detected based on overlapping wireless network coverage between the first user device 102 and the second user device 102. In some embodiments, proximity is detected based on receipt of one or more WPAN 104 and/or WLAN 106 messages. In some embodiments, proximity is detected based on receipt of BTLE messages for a proximity profile. In step 504, the first user device 102 exchanges device capabilities with the second user device 102. In step 506, the first user device 102 exchanges service information and/or application information with the second user device 102. In step 508, the first user device 102 and the second user device 102 negotiate alert notification configurations for the first user device 102 and for the second user device 102 based at least in part on any combination of the device capabilities, the service information, and/or the application information exchanged with the second user device 102. In step 510, the first user device 102 is configured to operate either as a primary user device for itself, which can be a default configuration when operating in a non-overlapping state or when no applications and/or services are shared/synchronized with the second user device 102, or as a primary user device for both the first user device 102 and for the second user device 102, where the primary user device provides alert notifications for one or more shared/synchronized applications and or services for both the first user device 102 and for the second user device 102, where configuration is based at least in part on the negotiation. In some embodiments, the primary user device is configured to provide auditory (audible) alert notifications, while the secondary user device is configured to provide silent (and/or suppress auditory) alert notifications. In step 512, the first user device 102, when configured to operate as a primary user device for the second user device 102, communicates keep alive messages to maintain proximity detection with the second user device 102.

For the foregoing flowchart, it will be readily appreciated that not every step provided is always necessary, and that further steps not set forth herein may also be included. For example, added steps that involve specific time determinations for given commands or alerts to be broadcast may be added. Also, steps that provide more detail with respect to various system components or features could also be added. Furthermore, the exact order of steps may be altered as desired, and some steps may be performed simultaneously.

Representative Embodiments

In some embodiments, a method for coalescing alert notifications for a set of associated user devices, performed by a first user device of the set of associated user devices includes: (i) detecting proximity of a second user device of the set of associated user devices; (ii) exchanging device capabilities with the second user device; (iii) exchanging one or more of service information or application information with the second user device; (iv) negotiating alert notification configurations for the first user device and the second user device based at least in part on any combination of the device capabilities, service information, or application information exchanged with the second user device; and (v) configuring the first user device to operate as a primary user device that provides alert notifications for one or more of shared applications or services for only the first user device or for both the first user device and the second user device based at least in part on the negotiation.

In some embodiments, the method further includes the first user device communicating keep alive messages to maintain proximity detection for the second user device when configured to operate as the primary user device for the second user device. In some embodiments, the first user device is configured to operate as the primary user device further based at least in part on proximity to a user of the set of associated user devices. In some embodiments, the first user device is configured to operate as the primary user device further based on indications of most recent usage for the first user device and for the second user device. In some embodiments, the first user device is configured to operate as the primary user device further based at least in part on indications of most recent usage for the first user device and for the second user device. In some embodiments, association of the user devices of the set of associated user devices is based at least in part on a common network-based service account. In some embodiments, the first user device provides auditory alert notifications when configured as the primary user device. In some embodiments, the method further includes the first user device causing the second user device to be configured as a secondary user device when the first user device is configured as the primary user device. In some embodiments, the secondary user device provides silent alert notifications when configured as the secondary user device. In some embodiments, the first user device detects proximity of the second user device based at least in part on overlapping wireless network coverage between the first user device and the second user device. In some embodiments, the first user device detects proximity of the second user device further based at least in part on receipt of one or more wireless personal area network (WPAN) and/or wireless local area network (WLAN) messages from the second user device. In some embodiments, the WPAN messages include Bluetooth Low Energy (BTLE) messages for a proximity profile.

In some embodiments, a first user device of a set of associated user devices includes: (i) wireless circuitry communicatively coupled to one or more antennas; and (ii) processing circuitry communicatively coupled to the wireless circuitry, the processing circuitry including a processor and a memory storing instructions that, when executed by the processor, cause the first user device to: detect proximity of a second user device of the set of associated user devices; exchange device capabilities with the second user device; exchange one or more of service information or application information with the second user device; negotiate alert notification configurations for the first user device and the second user device based at least in part on any combination of the device capabilities, service information, or application information exchanged with the second user device; and configure the first user device to operate as a primary user device that provides alert notifications for one or more of shared applications or services for only the first user device or for both the first user device and the second user device based at least in part on the negotiation.

In some embodiments, execution of the instructions further causes the first user device to communicate keep alive messages to maintain proximity detection for the second user device when configured to operate as the primary user device for the second user device. In some embodiments, the first user device is configured to operate as the primary user device further based at least in part on proximity to a user of the set of associated user devices. In some embodiments, the first user device is configured to operate as the primary user device further based at least in part on indications of most recent usage for the first user device and for the second user device. In some embodiments, association of user devices of the set of associated user devices is based at least in part on a common network-based service account. In some embodiments, when the first user device is configured as the primary device: (i) the first user device provides auditory alert notifications; (ii) the first user device provides auditory alert notifications; (iii) the first user device causes the second user device to be configured as a secondary user device; and (iv) the secondary user device provides silent alert notifications when configured as the secondary user device. In some embodiments, the first user device detects proximity of the second user device based at least in part on: (i) an overlapping wireless network coverage between the first user device and the second user device; and (ii) receipt of one or more wireless personal area network (WPAN) and/or wireless local area network (WLAN) messages from the second user device. In some embodiments, the WPAN messages include Bluetooth Low Energy (BTLE) messages for a proximity profile.

In some embodiments, an integrated circuit apparatus, configurable for operation in a first user device of a set of associated user devices, includes: (i) a processor; and (ii) a memory storing instructions that, when executed by the processor, cause the first user device to: detect proximity of a second user device of the set of associated user devices; exchange device capabilities with the second user device; exchange one or more of service information or application information with the second user device; negotiate alert notification configurations for the first user device and the second user device based at least in part on any combination of the device capabilities, service information, or application information exchanged with the second user device; and configure the first user device to operate as a primary user device that provides alert notifications for one or more of shared applications or services for only the first user device or for both the first user device and the second user device based at least in part on the negotiation.

Figure 6:
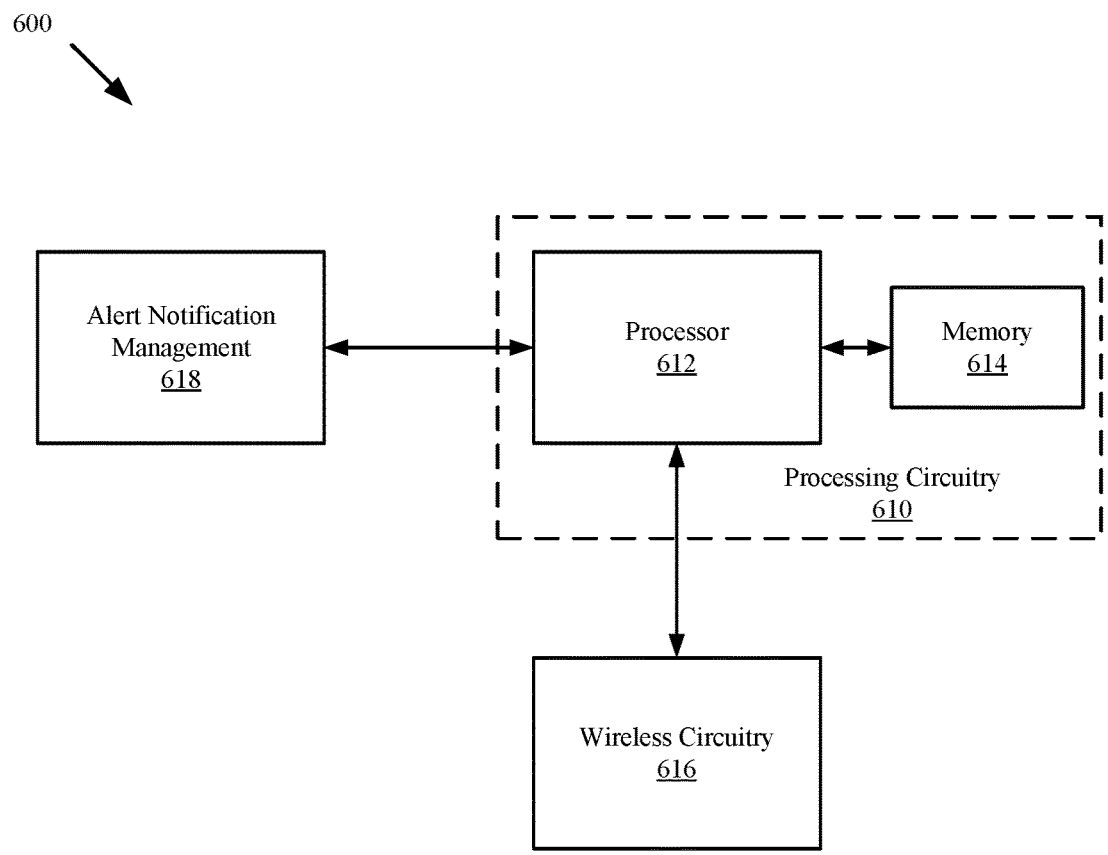
FIG. 6 illustrates in block diagram format an exemplary computing device that can be used to implement the various components and techniques described herein according to various embodiments of the present disclosure.

FIG. 6 illustrates a block diagram of an example apparatus 600 that can be implemented in a user device 102, e.g., a central user device 210, an associated user device 220A/B/C, a primary user device 310A/B/C, a secondary user device 320A, and/or to realize, at least in part, an alert notification management mechanism, in accordance with some embodiments. It will be appreciated that the components, devices or elements illustrated in and described with respect to FIG. 6 may not be mandatory and thus some may be omitted in certain embodiments. Additionally, some embodiments can include further or different components, devices or elements beyond those illustrated in and described with respect to FIG. 6. Further, it will be appreciated that, in some embodiments, one or more components of the apparatus 600 can be distributed across a plurality of computing devices that can collectively provide the functionality for alert notification management.

In some example embodiments, the apparatus 600 can include processing circuitry 610 that is configurable to perform actions in accordance with one or more example embodiments disclosed herein. In this regard, the processing circuitry 610 can be configured to perform and/or control performance of one or more functionalities of the apparatus 600 in accordance with various embodiments, and thus can provide means for performing functionalities of the apparatus 600 in accordance with various embodiments. The processing circuitry 610 can be configured to perform data processing, application execution and/or other processing and management services according to one or more embodiments.

In some embodiments, the apparatus 600 or a portion(s) or component(s) thereof, such as the processing circuitry 610, can include one or more chipsets, each of which can include one or more chips. The processing circuitry 610 and/or one or more further components of the apparatus 600 can therefore, in some instances, be configured to implement an embodiment on a chipset comprising one or more chips. In some example embodiments in which one or more components of the apparatus 600 are embodied as a chipset, the chipset can be capable of enabling a computing device(s) to operate wireless device in accordance with embodiments as disclosed herein.

In some example embodiments, the processing circuitry 610 can include a processor 612 and, in some embodiments, such as that illustrated in FIG. 6, can further include memory 614 (and/or another non-transitory storage medium). The processing circuitry 610 can be in communication with or otherwise control wireless circuitry 616 and/or an alert notification management module 618.

The processor 612 can be embodied in a variety of forms. For example, the processor 612 can be embodied as various processing hardware-based means such as a microprocessor, a coprocessor, a controller or various other computing or processing devices including integrated circuits such as, for example, an ASIC (application specific integrated circuit), an FPGA (field programmable gate array), some combination thereof, or the like. Although illustrated as a single processor, it will be appreciated that the processor 612 can include a plurality of processors. The plurality of processors can be in operative communication with each other and can be collectively configured to perform one or more functionalities of the apparatus 600 as described herein. In embodiments including a plurality of processors, the plurality of processors can be implemented on a single computing device, or can be distributed across a plurality of computing devices that can collectively provide functionality of a user device 102, such as a primary user device 310A/B/C and/or a secondary user device 320A. In some example embodiments, the processor 612 can be configured to execute instructions that can be stored in the memory 614 or that can be otherwise accessible to the processor 612. As such, whether configured by hardware or by a combination of hardware and software, the processor 612 can be capable of performing operations according to various embodiments while configured accordingly.

In some embodiments, the memory 614 can include one or more memory devices. The memory 614 can include fixed and/or removable memory devices. In some embodiments, the memory 614 can provide a non-transitory computer-readable storage medium that can store computer program instructions that can be executed by the processor 612. In this regard, the memory 614 can be configured to store information, data, applications, instructions and/or the like for enabling the apparatus 600 to carry out various functions in accordance with one or more embodiments. In embodiments including a plurality of memory devices, the plurality of memory devices can be implemented on a single computing device, or can be distributed across a plurality of computing devices that can collectively provide functionality of a wireless device. In some embodiments, the memory 614 can be in communication with one or more of the processor 612, wireless circuitry 616, or alert notification management module 619 via one or more busses for passing information among components of the apparatus 600.

The apparatus 600 can further include wireless circuitry 616. The wireless circuitry 616 can include one or more interface mechanisms for enabling communication with other devices and/or networks. For example, the wireless circuitry 616 can be configured to enable the apparatus 600 to communicate over one or more networks, such as the WWAN 108, the WLAN 106, and/or the WPAN 104. The apparatus 600 can include multiple sets of wireless circuitry 616, which can each provide communication in accordance with a wireless communication protocol. In various embodiments, the wireless circuitry 616 can include, for example, an antenna (or multiple antennas) and supporting hardware and/or software for enabling communications with one or more wireless communication networks, such as a cellular network. In some embodiments, the wireless circuitry 616 can be referred to as a communication interface(s) and include a combination of requisite hardware, software, or firmware to provide wireless communications in accordance with one or more wireless communication protocols, such as a Wi-Fi protocol, an IEEE 802.11 wireless communication protocol, a cellular wireless communication protocol, a WLAN protocol, a WPAN protocol, e.g., such as Bluetooth or Apple Wireless Direct Link (AWDL).

The apparatus 600 can further include an alert notification management module 618. The wireless connection management module 618 can be embodied as various means, such as circuitry, hardware, a computer program product comprising computer readable program instructions stored on a non-transitory computer readable medium (for example, the memory 614) and executed by a processing device (for example, the processor 612), or some combination thereof. In some embodiments, the processor 612 (or the processing circuitry 610) can include, or otherwise control the alert notification management module 618. The alert notification management module 618 can be configured to support management of alert notifications for the apparatus 600 and/or for other user devices 102 in support of one or more example embodiments.

Figure 7:
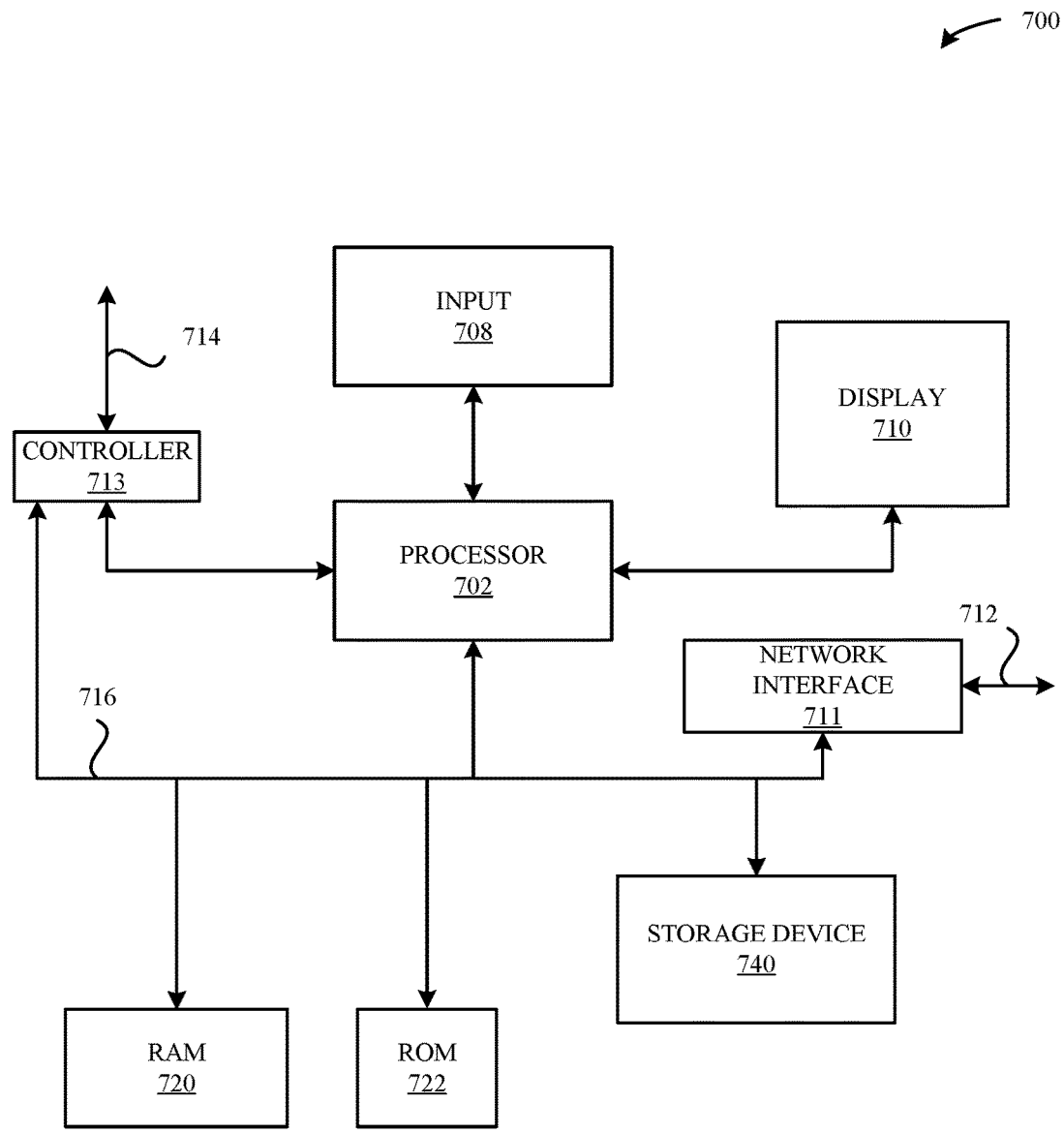
FIG. 7 illustrates in block diagram format an example representative set of elements of a user device that can be used to implement the various components and techniques described herein according to various embodiments of the present disclosure.

FIG. 7 illustrates in block diagram format an exemplary computing device 700 that can be used to implement the various components and techniques described herein, according to some embodiments. In particular, the detailed view of the exemplary computing device 700 illustrates various components that can be included in the wireless device 102 illustrated in FIG. 1. As shown in FIG. 7, the computing device 700 can include a processor 702 that represents a microprocessor or controller for controlling the overall operation of computing device 700. The computing device 700 can also include a user input device 708 that allows a user of the computing device 700 to interact with the computing device 700. For example, the user input device 708 can take a variety of forms, such as a button, keypad, dial, touch screen, audio input interface, visual/image capture input interface, input in the form of sensor data, etc. Still further, the computing device 700 can include a display 710 (screen display) that can be controlled by the processor 702 to display information to the user (for example, visual/silent alert notifications and/or information relating to incoming, outgoing, or active communication sessions). A data bus 716 can facilitate data transfer between at least a storage device 740, the processor 702, and a controller 713. The controller 713 can be used to interface with and control different equipment through an equipment control bus 714. The computing device 700 can also include a network/bus interface 711 that couples to a data link 712. In the case of a wireless connection, the network/bus interface 711 can include wireless circuitry, such as a wireless transceiver and/or baseband processor.

The computing device 700 also includes a storage device 740, which can comprise a single storage or a plurality of storages (e.g., hard drives), and includes a storage management module that manages one or more partitions within the storage device 740. In some embodiments, storage device 740 can include flash memory, semiconductor (solid state) memory or the like. The computing device 700 can also include a Random Access Memory ("RAM") 720 and a Read-Only Memory ("ROM") 722. The ROM 722 can store programs, utilities or processes to be executed in a non-volatile manner. The RAM 720 can provide volatile data storage, and stores instructions related to the operation of the computing device 700.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, hard storage drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for coalescing alert notifications for a set of associated user devices, the method comprising:
   by a first user device of the set of associated user devices:
   detecting proximity of a second user device of the set of associated user devices;
   exchanging device capabilities with the second user device;
   exchanging one or more of service information or application information with the second user device;
   negotiating alert notification configurations between the first user device and the second user device based at least in part on any combination of the device capabilities exchanged with the second user device, service information exchanged with the second user device, or application information exchanged with the second user device; and
   configuring, based at least in part on the negotiation, the first user device to operate as a primary user device that provides alert notifications for one or more of shared applications or services for:
   (i) only the first user device, or
   (ii) both the first user device and the second user device.

2. The method of claim 1, further comprising communicating keep alive messages to maintain proximity detection for the second user device when configured to operate as the primary user device for the second user device.

3. The method of claim 1, wherein the first user device is configured to operate as the primary user device further based at least in part on proximity to a user of the set of associated user devices.

4. The method of claim 1, wherein the first user device is configured to operate as the primary user device further based on indications of most recent usage for the first user device and for the second user device.

5. The method of claim 1, wherein association of the user devices of the set of associated user devices is based at least in part on a common network-based service account.

6. The method of claim 1, wherein the first user device provides auditory alert notifications when configured as the primary user device.

7. The method of claim 6, further comprising causing the second user device to be configured as a secondary user device when the first user device is configured as the primary user device.

8. The method of claim 7, wherein the secondary user device provides silent alert notifications when configured as the secondary user device.

9. The method of claim 1, wherein the first user device detects proximity of the second user device based at least in part on an overlapping wireless network coverage between the first user device and the second user device.

10. The method of claim 9, wherein the first user device detects proximity of the second user device further based at least in part on receipt of one or more wireless personal area network (WPAN) and/or wireless local area network (WLAN) messages from the second user device.

11. The method of claim 10, wherein the WPAN messages comprise Bluetooth Low Energy (BTLE) messages for a proximity profile.

12. A first user device of a set of associated user devices, the first user device comprising:
   wireless circuitry communicatively coupled to one or more antennas; and
   processing circuitry communicatively coupled to the wireless circuitry, the processing circuitry including a processor and a memory storing instructions that, when executed by the processor, cause the first user device to:
   detect proximity of a second user device of the set of associated user devices;
   exchange device capabilities with the second user device;
   exchange one or more of service information or application information with the second user device;
   negotiate alert notification configurations between the first user device and the second user device based at least in part on any combination of the device capabilities exchanged with the second user device, service information exchanged with the second user device, or application information exchanged with the second user device; and
   configure, based at least in part on the negotiation, the first user device to operate as a primary user device that provides alert notifications for one or more of shared applications or services for:
   (i) only the first user device, or
   (ii) both the first user device and the second user device.

13. The first user device of claim 12, wherein execution of the instructions further causes the first user device to communicate keep alive messages to maintain proximity detection for the second user device when configured to operate as the primary user device for the second user device.

14. The first user device of claim 12, wherein the first user device is configured to operate as the primary user device further based at least in part on proximity to a user of the set of associated user devices.

15. The first user device of claim 12, wherein the first user device is configured to operate as the primary user device further based at least in part on indications of most recent usage for the first user device and for the second user device.

16. The first user device of claim 12, wherein association of user devices of the set of associated user devices is based at least in part on a common network-based service account.

17. The first user device of claim 12, wherein: when the first user device is configured as the primary device: the first user device provides auditory alert notifications; the first user device causes the second user device to be configured as a secondary user device; and the secondary user device provides silent alert notifications when configured as the secondary user device.

18. The first user device of claim 12, wherein the first user device detects proximity of the second user device based at least in part on: an overlapping wireless network coverage between the first user device and the second user device; and receipt of one or more wireless personal area network (WPAN) and/or wireless local area network (WLAN) messages from the second user device.

19. The first user device of claim 18, wherein the WPAN messages comprise Bluetooth Low Energy (BTLE) messages for a proximity profile.

20. An integrated circuit apparatus configurable for operation in a first user device of a set of associated user devices, the integrated circuit apparatus comprising:
   a processor; and
   a memory storing instructions that, when executed by the processor, cause the first user device to:
   detect proximity of a second user device of the set of associated user devices;
   exchange device capabilities with the second user device;
   exchange one or more of service information or application information with the second user device;
   negotiate alert notification configurations between the first user device and the second user device based at least in part on any combination of the device capabilities exchanged with the second user device, service information exchanged with the second user device, or application information exchanged with the second user device; and
   configure, based at least in part on the negotiation, the first user device to operate as a primary user device that provides alert notifications for one or more of shared applications or services for:
   (i) only the first user device, or
   (ii) both the first user device and the second user device.

* * * * *